US012609343B2

(12) United States Patent
Rhee et al.

(10) Patent No.: US 12,609,343 B2
(45) Date of Patent: Apr. 21, 2026

(54) BATTERY CELL INCLUDING A BEND PORTION AND BATTERY MODULE INCLUDING SAME

(71) Applicant: SK ON CO., LTD., Seoul (KR)

(72) Inventors: Seo Roh Rhee, Daejeon (KR); Ha Chul Jeong, Daejeon (KR); Yang Kyu Choi, Daejeon (KR); Jeong Woo Han, Daejeon (KR)

(73) Assignee: SK ON CO., LTD., Seoul (KR)

( * ) Notice: Subject to any disclaimer, the term of this patent is extended or adjusted under 35 U.S.C. 154(b) by 888 days.

(21) Appl. No.: 17/902,760

(22) Filed: Sep. 2, 2022

(65) Prior Publication Data

US 2023/0070367 A1     Mar. 9, 2023

(30) Foreign Application Priority Data

Sep. 3, 2021     (KR) ........................ 10-2021-0117545

(51) Int. Cl.
| | |
|---|---|
| *H01M 10/04* | (2006.01) |
| *H01M 50/105* | (2021.01) |
| *H01M 50/178* | (2021.01) |
| *H01M 50/184* | (2021.01) |

(52) U.S. Cl.
CPC ....... *H01M 10/045* (2013.01); *H01M 50/105* (2021.01); *H01M 50/178* (2021.01); *H01M 50/184* (2021.01)

(58) Field of Classification Search
CPC ............. H01M 10/045; H01M 50/178; H01M 50/105; H01M 50/184
See application file for complete search history.

(56) References Cited

U.S. PATENT DOCUMENTS

| | | | |
|---|---|---|---|
| 2015/0364729 A1 | 12/2015 | Jang | |
| 2017/0092923 A1* | 3/2017 | Pasma ................. | H01M 50/138 |
| 2018/0219245 A1 | 8/2018 | Choi et al. | |
| 2020/0111999 A1* | 4/2020 | Kim .................... | H01M 50/105 |

FOREIGN PATENT DOCUMENTS

| | | | | | |
|---|---|---|---|---|---|
| CN | 101875238 A | * | 11/2010 | | |
| EP | 2940756 A1 | * | 11/2015 | ........ | H01M 10/0481 |
| EP | 3567649 A1 | * | 11/2019 | ............ | B29C 65/02 |
| EP | 3998217 A1 | | 5/2022 | | |
| JP | 2007200589 A | | 8/2007 | | |
| KR | 10-2015-0144614 A | | 12/2015 | | |
| KR | 10-2017-0052061 A | | 5/2017 | | |
| KR | 10-2021-0006712 A | | 1/2021 | | |
| WO | WO-2019178773 A1 | * | 9/2019 | ......... | H01M 50/186 |
| WO | WO-2021006529 A1 | * | 1/2021 | ......... | H01M 50/184 |

OTHER PUBLICATIONS

EP 2940756 English Translation (Year: 2015).*
EP 3567649 English Translation (Year: 2019).*
CN 101875238 English Translaiton (Year: 2010).*
WO 2019178773 English Translation (Year: 2019).*
WO 2021006529 English Translation (Year: 2020).*

* cited by examiner

*Primary Examiner* — Jimmy Vo
(74) *Attorney, Agent, or Firm* — Perkins Coie LLP

(57) ABSTRACT

A battery cell includes an electrode assembly including a plurality of electrode plates; and a pouch surrounding the electrode assembly, wherein the pouch includes a folded portion folded along one edge of the electrode assembly; a sealing portion formed along a remaining edge of the electrode assembly; and a bend portion including a portion in which the sealing portion and the folded portion meet, therein the portion is bent toward the sealing portion.

17 Claims, 9 Drawing Sheets

BATTERY CELL INCLUDING A BEND PORTION AND BATTERY MODULE INCLUDING SAME

CROSS-REFERENCE TO RELATED APPLICATION(S)

This application claims benefit of priority to Korean Patent Application No. 10-2021-0117545 filed in the Korean Intellectual Property Office on Sep. 3, 2021, the disclosure of which is incorporated herein by reference in its entirety.

TECHNICAL FIELD

The present disclosure relates to a battery cell and a battery module including the battery cell therein.

BACKGROUND

As technological developments and demand for mobile devices, electric vehicles, and energy storage systems (ESS) increase, demand for secondary battery cells as an energy source is rapidly increasing. A secondary battery cell is a battery capable of repeating charging and discharging of electrical energy, because mutual conversion between chemical energy and electrical energy are reversible. In particular, since a lithium secondary battery has a high operating voltage and a high energy density per unit weight, utility thereof is rapidly increasing.

Lithium secondary batteries mainly use lithium-based oxide as a positive electrode active material and a carbon material as a negative electrode active material, and may be generally classified into lithium ion batteries, lithium ion polymer batteries, and lithium polymer batteries, depending on a type of electrolyte used. Depending on a shape of the battery, lithium secondary batteries may be classified as a cylindrical secondary battery cell, a prismatic secondary battery cell, or a pouch-type secondary battery cell. Theamong, the pouch-type secondary battery cell may include an electrode assembly such as a positive electrode plate, a negative electrode plate, a separator, an electrolyte, and the like, and a cell body member formed of a laminated film case protecting the electrode assembly, or the like.

SUMMARY

The present disclosure includes features in battery cell designs for various battery applications including pouch-type secondary battery devices.

In some battery applications, a plurality of the pouch-type secondary battery (battery cells) may be stacked and stored in a space in a battery module. For high energy density, it is advantageous to increase a size of a single battery cell. When an unnecessary portion exists in the pouch-type secondary battery cell, there may be a limit to increasing the size thereof. The disclosed technology may be used in ways to improve a space utilization rate and energy density of the battery module. For example, certain implementations of the disclosed technology may be used to provide a battery cell increasing energy density based on the same external size by reducing or deleting an unnecessary portion.

In some implementations, the disclosed technology of the present disclosure can be used to provide a battery cell maximally reducing a protruding portion generated from an edge of a pouch as a case of the pouch is sealed.

In some implementations, the disclosed technology of the present disclosure can be to provide a battery module increasing cooling efficiency while having a high energy density by adhering a battery cell to a space in the battery module.

According to an aspect of the present disclosure, a battery cell can include an electrode assembly including a plurality of electrode plates; and a pouch surrounding the electrode assembly, wherein the pouch includes a folded portion folded along one edge of the electrode assembly; a sealing portion formed along at least a portion of a remaining edge of the electrode assembly; and a bend portion in which a portion in which the sealing portion and the folded portion intersect is bent toward the sealing portion.

In embodiments, the bend portion may be configured to face the sealing portion.

In embodiments, the bend portion may be bent along a first bending line parallel to the folded portion.

In embodiments, the bend portion may be bent along a second bending line formed obliquely to the folded portion, and an edge of the bend portion does not protrude exceeding the folded portion in an outward direction.

In embodiments, the pouch may include a body portion in which the electrode assembly is accommodated, and the second bending line may pass by one corner of the body portion but may not pass through the body portion.

In embodiments, the bend portion may include a first portion bent by 180 degrees along a third bending line parallel to the second bending line; and a second portion connected to the first portion and bent by 180 degrees along the second bending line.

In embodiments, the bend portion may be provided to have a spiral shape rolled in one direction, and an edge of the bend portion may not protrude exceeding the folded portion in an outward direction.

In embodiments, a central axis of the spiral shape may be formed to be oblique to the folded portion.

In embodiments, the battery cell may further include an adhesive member maintaining a bent state of the bend portion.

In embodiments, the adhesive member may be disposed between the bend portion and the sealing portion.

In embodiments, at least one of the plurality of electrode plates may include a chamfered portion in which a corner adjacent to the bend portion is cut.

In embodiments, the chamfered portion has a shape curved toward the inside of the plurality of electrode plates.

According to another aspect of the present disclosure, a battery module can include a battery cell; and a frame having a seating surface on which the folded portion of the battery cell is seated, wherein an edge of the bend portion of the battery cell is disposed at the same height as the seating surface or disposed at a position higher than the seating surface.

In embodiments, a thickness of a portion of the frame facing the folded portion may be equal to a thickness of a portion of the frame facing the bend portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
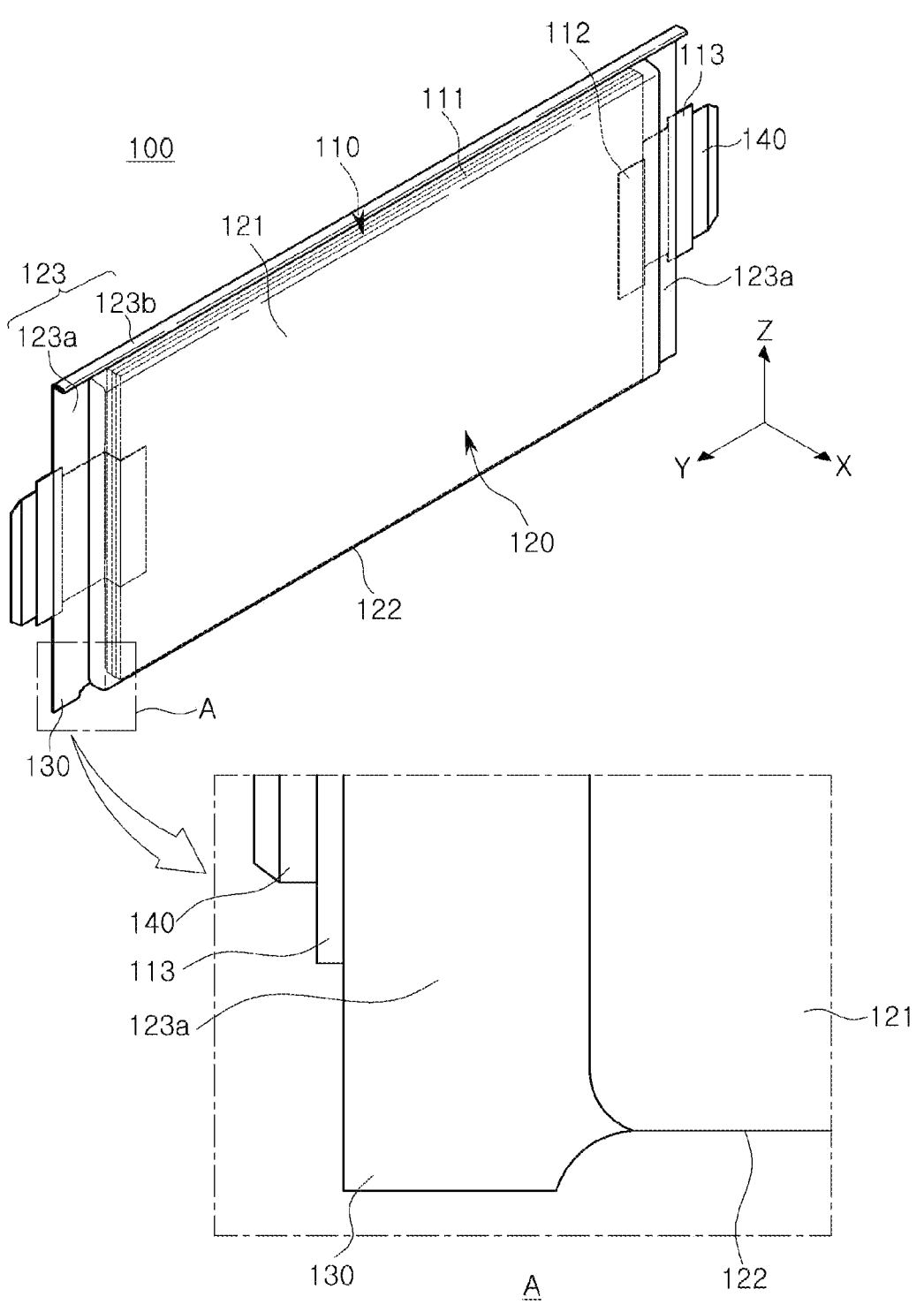
FIG. 1 is a perspective view illustrating an example of a pouch-type battery cell.

Prior to the detailed description of the present disclosure, terms or words used in the specification and claims, described below, should not be construed as being limited to their ordinary or dictionary meanings, and the inventors should develop their own inventions in the best way. It should be interpreted as meaning and concept consistent with the technical idea of the present disclosure, based on the principle that it may be appropriately defined as a concept of a term for explanation. Therefore, it should be understood that since embodiments described in the specification and configurations illustrated in the drawings may be only the most preferred embodiments of the present disclosure, and do not represent all the technical ideas of the present disclosure, there may be various equivalents and variations to be replaced at the time of filing the present disclosure.

Hereinafter, preferred embodiments of the present disclosure will be described with reference to the accompanying drawings. However, embodiments of the present disclosure may be modified in various other forms, and the scope of the present disclosure is not limited to embodiments described below. In addition, embodiments of the present disclosure may be provided in order to more completely explain the present disclosure to those of ordinary skill in the art. The shapes and sizes of components in the drawings may be exaggerated for clarity of description.

Also, in this specification, singular expressions include plural expressions unless the context clearly dictates otherwise, and the same reference numerals or reference numerals assigned in a similar manner throughout the specification refer to the same component or corresponding component.

For example, in the present specification, expressions of "upper," "upper side," "upper portion," "lower," "lower side," "lower portion," "side," "side surface," "front," "front surface," "rear," "rear surface," and the like may be described with reference to the drawings, and are noted in advance that if a direction of an object is changed, it may be expressed differently.

In addition, terms including an ordinal number, such as "first", "second", etc. used herein may be used to describe various components, but the components are not limited by the terms, and the terms may be used only for the purpose of distinguishing one component from another component. For example, without departing from the scope of the present disclosure, a first component may be referred to as a second component, and similarly, a second component may also be referred to as a first component.

FIG. 1 is a perspective view illustrating an example of a pouch-type battery cell 100.

Referring to FIG. 1, a battery cell 100 may be configured as a pouch-type secondary battery. The pouch-type secondary battery may include an electrode assembly 110 including a plurality of electrode plates 111, a pouch 120 surrounding the electrode assembly 110, and an electrode lead 140 protruding from the electrode assembly 110 to an outside of the pouch 120.

The electrode assembly 110 may include the plurality of electrode plates 111, and electrode tabs 112 connected to at least a portion of the electrode plates 111, and may be accommodated in the pouch 120. In this case, the plurality of electrode plates 111 may include a positive electrode plate, a negative electrode plate, and a separator. The electrode assembly 110 may be provided to be alternately stacked with the separator interposed therebetween with wide surfaces of the positive electrode plates and wide surfaces of the negative electrode plates facing each other.

The positive and negative electrode plates may be formed in a structure in which an active material slurry is applied to a current collector. In general, the slurry may be formed by stirring a granular active material, an auxiliary conductor, a binder, a plasticizer, or the like in a state in which a solvent is added.

The electrode assembly 110 may be provided by alternately stacking a plurality of positive and negative electrode plates in a predetermined direction (e.g., in an X-axis direction of FIG. 1). In this case, each of the plurality of positive and negative electrode plates may comprise the electrode tabs 112, and each of the electrode tabs 112 may be connected to the electrode lead 140 to contact each other with the same polarity. In the battery cell 100 illustrated in FIG. 1, although two electrode leads 140 are illustrated as being disposed to face in opposite directions, but in the same direction (e.g., in a positive Y-axis direction in FIG. 1), it is also possible to be disposed in different positions from each other.

The pouch 120 included in the battery cell 100 may form an exterior of the battery cell 100, and may provide an internal space in which the electrode assembly 110, electrolyte (not illustrated), and the like are accommodated.

The pouch 120 may be formed by forming a single sheet of exterior material. Specifically, after forming one or two accommodation portions on a sheet of exterior material, a final shape of the pouch 120 according to embodiments may be completed by folding the exterior material to form one space (e.g., a body portion 121) in which the accommodation portion may accommodate the electrode assembly 110 or the like.

The body portion 121 may be provided to accommodate the electrode assembly 110 therein, and may be provided in a rectangular shape formed along an edge of the electrode assembly 110. A sealing portion 123 formed by bonding exterior materials to each other may be provided on an edge of the body portion 121. A thermal fusion method may be used for bonding the exterior material for forming the sealing portion 123, but the present disclosure is not limited thereto.

A portion of the electrode lead 140 of the electrode assembly 110 may be exposed to an outside of the sealing portion 123. The sealing portion 123 may be divided into a first sealing portion 123*a* in which the electrode lead 140 is disposed, and a second sealing portion 123*b* in which the electrode lead 140 is not disposed. In this case, the electrode lead 140 may have a configuration covered by an insulating portion 113. Therefore, a sealing degree of the first sealing portion 123a may be increased in a position in which the electrode lead 140 is lead out, and at the same time, an electrical insulation state may be obtained It is not necessary to form the sealing portion 123 on a surface on which an exterior material is folded along one edge of the electrode assembly 110. A portion in which the exterior material is folded along the one edge of the electrode assembly 110 may be referred to as a folded portion 122, to distinguish it from the sealing portion 123. For example, the pouch 120 may have a three-sided sealing pouch shape in which the sealing portion 123 is formed on three surfaces, among four surfaces of an edge of the body portion 121, and the folded portion 122 is formed on a remaining surface.

In performing three-sided sealing by folding a sheet of exterior material and surrounding the electrode assembly 110, as described above, a portion protruding further than the folded portion 122 in an outward direction (e.g., in a negative Z-axis direction of FIG. 1) may occur in a sealing portion 123 adjacent to the folded portion 122, due to a thickness of the electrode assembly 110 and a thickness of the body portion 121 accommodating the same. For example, as illustrated in the enlarged view of portion A of FIG. 1, in a portion extending from the first sealing portion 123a to the folded portion 122, a protrusion 130 protruding exceeding the folded portion 122 in an outward direction may be formed.

A portion protruding exceeding the folded portion 122 in an outward direction may be called a shark-fin, a delta-fin, or a bat-ear. Therefore, since an external shape of the battery cell 100 may be entirely larger than necessary, there may be a problem in that an energy density or cooling efficiency of a battery module or a battery pack may be reduced.

Since the shark-fin (the protrusion 130) in a corner of the battery cell 100 protrudes exceeding a folding surface of the folded portion 122 in an outward direction, the folded portion 122 of the battery cell 100 may not be in close contact with an inner surface of a battery module (200 in FIG. 7) or an inner surface of a battery pack. Therefore, an unnecessary dead space may be formed between the folded portion 122 and the battery module (200 in FIG. 7). For example, due to the protrusion 130, a gap may be formed between the folded portion 122, which may be a lower surface of the body portion 121, and the inner surface of the battery module (200 in FIG. 7). Therefore, an energy density of the battery module (200 in FIG. 7) may be reduced.

To eliminate such a gap, a battery cell 100 according to embodiments may provide a structure in which a size of the shark-fin is reduced or eliminated by processing the protrusion 130. For example, the battery cell 100 illustrated in FIG. 1 may be in a state before processing the protrusion 130 in a battery cell 100 according to embodiments.

Hereinafter, a battery cell 100 in which the protrusion 130 is processed according to embodiments will be described in detail with reference to FIGS. 2 to 6.

FIGS. 2 to 6 may be views illustrating a processed shape of a protrusion included in a battery cell 100 according to various embodiments.

Figure 2:
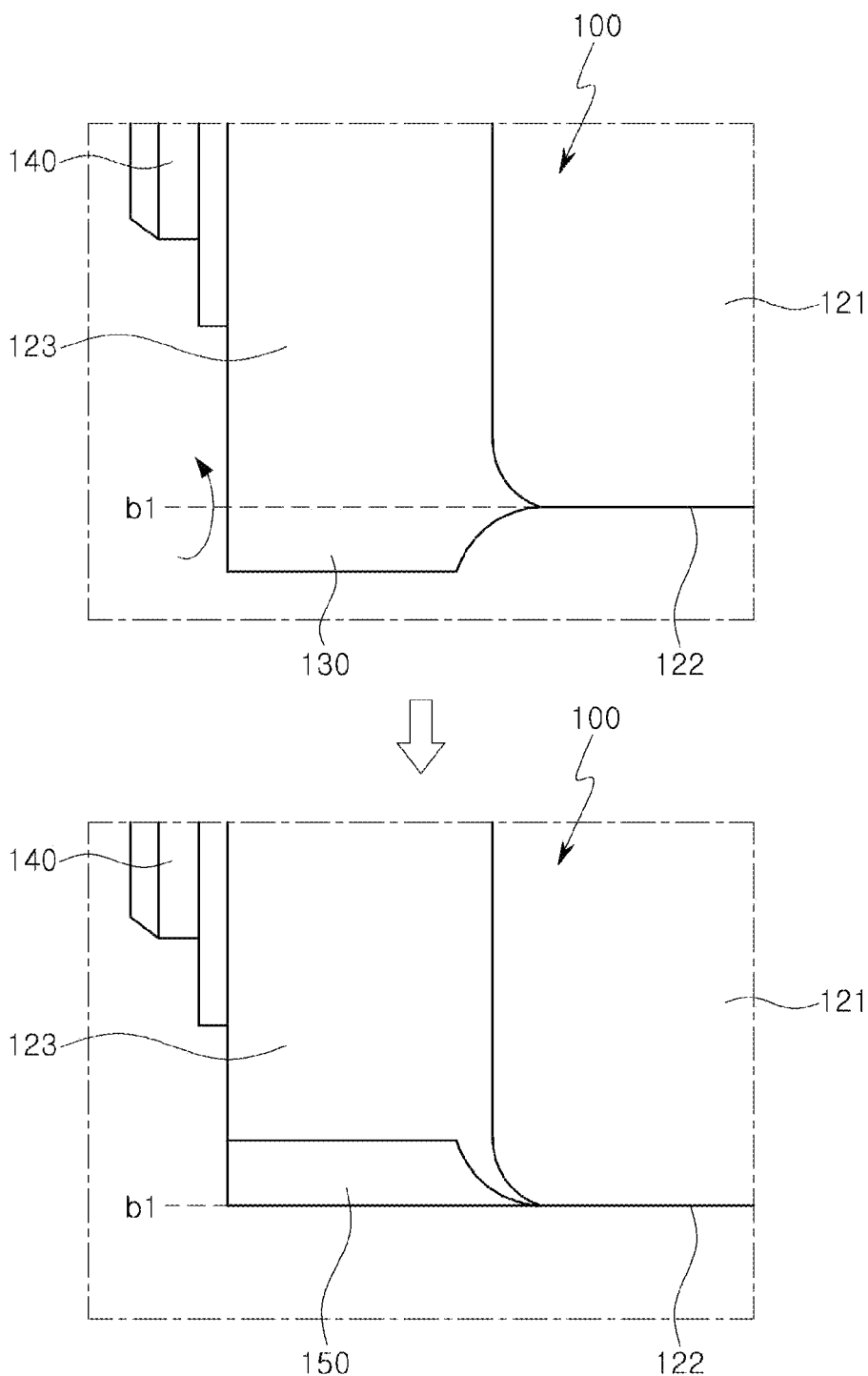
FIG. 2 is a partial side view of a battery cell having a bend portion according to an embodiment.
Figure 3:
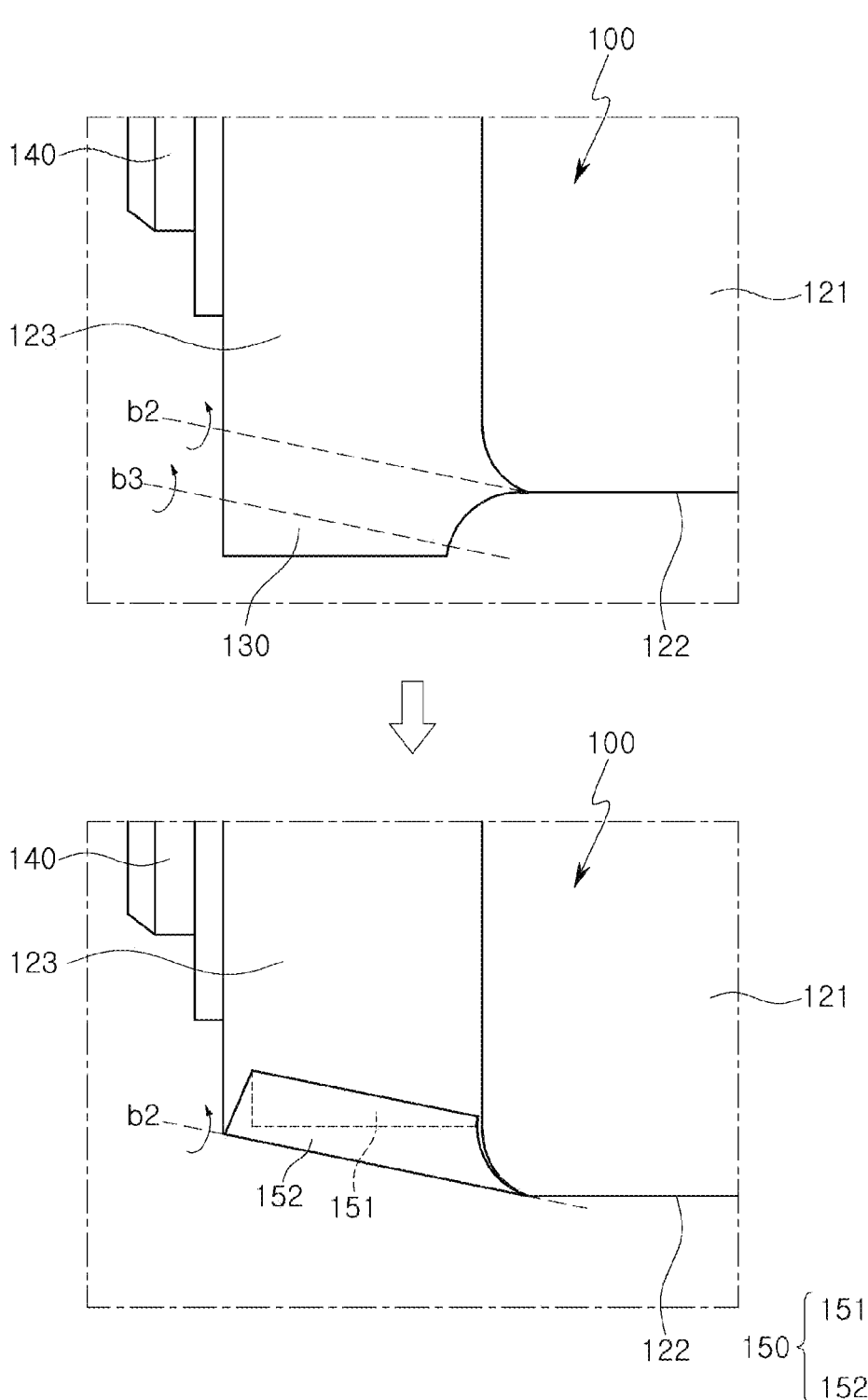
FIG. 3 is a partial side view of a battery cell having a bend portion according to embodiments.

First, a bend portion 150 formed by bending a protrusion 130 will be described with reference to FIGS. 2 and 3. FIGS. 2 and 3 may be partial side views of a battery cell 100 having a bend portion 150 according to embodiments.

A battery cell 100 described in FIGS. 2 and 3 may be obtained by processing the protrusion 130 of the battery cell 100 described in FIG. 1. For example, since a battery cell 100 described in FIGS. 2 and 3 may include all other components, except for a shape of the protrusion 130 illustrated in portion A of FIG. 1, descriptions overlapping FIG. 1 will be omitted. For example, a battery cell 100 described in FIGS. 2 and 3 may be a three-sided sealing pouch-type battery cell 100, like the battery cell 100 of FIG. 1. In this case, a pouch 120 may include a body portion 121 in which an electrode assembly 110 is accommodated, a folded portion 122 folded along one edge of the electrode assembly 110, and a sealing portion 123 in which remaining three surfaces of the electrode assembly 110 are sealed, and a portion of an electrode lead 140 of the electrode assembly 110 may be exposed to an outside of the sealing portion 123.

In embodiments, a bend portion 150 of the battery cell 100 may be formed in a boundary portion in which the sealing portion 123 and the folded portion 122 of the pouch 120 intersect or meet, and may be provided to be bent toward the sealing portion 123. For example, as illustrated in an upper partial view of FIG. 2, as an edge of the body portion 121 of the pouch 120 may be sealed, a protrusion 130 may be formed to protrude exceeding the body portion in an outward direction, compared to an edge of the folded portion 122, between the sealing portion 123 and the folded portion 122. According to embodiments, the protrusion 130 may be bent toward the sealing portion 123 along an imaginary line formed on an upper surface of the pouch 120, to form the bend portion 150. For example, a lower partial view of FIG. 2 illustrates a configuration after the protrusion 130 is bent according to embodiments. As illustrated, as the protrusion 130 is bent toward the sealing portion 123 to form the bend portion 150, a region protruding exceeding the folded portion 122 in an outward direction may be deleted, and an edge of a corner portion of the battery cell 100 (for example, the bend portion 150) may be formed to be parallel to the folded portion 122.

In some embodiments, the bend portion 150 of the battery cell 100 may be bent not to protrude exceeding the folded portion 122, forming a lower surface of the body portion 121, in an outward direction. For example, as illustrated in FIG. 2, the protrusion 130 may be bent along a first bending line b1 formed in parallel with the folded portion 122. A position of the first bending line b1 illustrated in FIG. 2 is only illustrative, and is not limited thereto. For example, in embodiments, the first bending line b1 does not necessarily have to be formed to be parallel to the folded portion 122, and the first bending line b1 may extend to be inclined at a predetermined angle with the folded portion 122. For example, the first bending line b1 may be formed to pass by one edge of the body portion 121 (e.g., an end portion of the folded portion 122), but not to pass through the body portion 121. Alternatively, the first bending line b1 may be formed to be parallel to the folded portion 122, and may be formed to be more inclined inwardly (e.g., toward the body portion 121) or may be formed to be more inclined outwardly, based on the folded portion 122.

In embodiments, the first bending line b1 may be an imaginary straight line extending from an end portion of the folded portion 122. Therefore, when the protrusion 130 is bent along the first bending line b1 to form the bend portion 150, an edge of the bend portion 150 may be formed along the first bending line b1, and may not protrude exceeding the folded portion 122 in an outward direction.

In some embodiments, the bend portion 150 may be bent 180 degrees along the first bending line b1. For example, as illustrated in the lower partial view of FIG. 2, the bend portion 150 may be bent at 180 degrees along the first bending line b1 to face the sealing portion 123. In this case, the bend portion 150 may come into contact with the sealing portion 123. FIG. 2 is only illustrative, and a bending angle of the bend portion 150 may be formed at various angles, other than 180 degrees. For example, the bend portion 150 may be bent at an angle, greater than 90 degrees and less than 180 degrees, along the first bending line b1. When bending at 90 degrees or more, an edge of the bend portion 150 may be located to be parallel to or on a level, higher than the folded portion 122. Therefore, a height of a shark-fin may be reduced or the shark-fin may not be formed at all.

In embodiments, the bend portion 150 may have a shape in which the protrusion 130 may be bent one or more times. For example, the protrusion 130 may be bent once along the first bending line b1, and in a bent state, another bending line (not illustrated) formed at a different position from the first bending line b1 may be formed. It may be bent once more accordingly. As the protrusion 130 may be bent a plurality of times, the size of the bend portion 150 may be further reduced.

Although the lower partial view of FIG. 2 illustrates the bend portion 150 on either side in a longitudinal direction (e.g., in the Y-axis direction of FIG. 1) of the battery cell 100, a bend portion 150 may be formed on the other side in the longitudinal direction of the battery cell 100 in the same way, and the bending structure described above may be equally applied to the bend portion 150 on the other side.

A battery cell 100 according to embodiments may include a bend portion 150 obtained by bending a portion (e.g., the protrusion 130) protruding, compared to the folded portion 122 forming the lower surface of the body portion 121, to reduce an overall height of the battery cell 100 (e.g., a length in the Z-axis direction of FIG. 1). Therefore, an overall energy density of a battery module or a battery pack, including the battery cell 100, may be increased.

A bending shape of the bend portion 150 may be provided in various manners. For example, FIG. 3 illustrates a configuration bent based on two bending lines (e.g., b2 and b3).

In some embodiments, a protrusion 130 may be bent along a second bending line b2 formed to be inclined to a folded portion 122. For example, as illustrated in FIG. 3, a second bending line b2 may be an imaginary line extending obliquely at a predetermined angle with respect to a folded portion 122 near one end portion of the folded portion 122. FIG. 3 is only illustrative for a position of the second bending line b2, and the position of the second bending line b2 is not limited thereto.

In embodiments, the second bending line b2 may be formed not to pass through a body portion 121 while passing by one corner of the body portion 121. For example, the second bending line b2 may be formed to pass by the corner of the body portion 121, but be inclined with respect to the folded portion 122 in a height direction of a battery cell 100.

In some embodiments, a bend portion 150 may be provided in which a protrusion 130 is bent at various angles along the second bending line b2. For example, when the protrusion 130 is bent 180 degrees along the second bending line b2, the bend portion 150 may be provided to face a sealing portion 123.

When the protrusion 130 is bent along the second bending line b2 formed at an angle to the folded portion 122, a height level of an edge of the bend portion 150 may be formed to be equal to a height level of the second bending line b2. Therefore, after being bent along the second bending line b2, the edge of the bend portion 150 may be located on a height level, higher than a height level of the folded portion 122. Therefore, such that the shark-fin may be completely removed. In this document, a 'height level' may mean a height from a reference portion (e.g., a lower surface of a battery module on which the battery cell is seated).

When the protrusion 130 is bent along the second bending line b2, an end of the protrusion 130 may come into contact with the body portion 121. To prevent this, before bending along the second bending line b2, the protrusion 130 may be bent once more to reduce a size of the bend portion 150. For example, in embodiments, the protrusion 130 may be bent a plurality of times, and a third bending line b3 may be formed in a location, different from the second bending line b2 for such a plurality of bending. For example, as illustrated in an upper partial view of FIG. 3, the third bending line b3 may be an imaginary line formed to pass by the protrusion 130 while parallel to the second bending line b2.

In embodiments, the protrusion 130 may be bent once along the third bending line b3 formed in a location, different from the second bending line b2, and then may be bent once again along the second bending line b2. For example, the bend portion 150 may include a first portion 151 in which the protrusion 130 is bent along the third bending line b3, and a second portion 152 connected to the first portion 151 and bent along the second bending line b2. As a result, as illustrated in a lower partial view of FIG. 3, an edge of the bend portion 150, sequentially bent along the third bending line b3 and the second bending line b2, may be formed along the second bending line b2, and may not protrude exceeding the folded portion 122 in an outward direction.

An angle bent along the second bending line b2 and an angle bent along the third bending line b3, in the bend portion 150, according to embodiments may be different from each other. For example, the bend portion 150 may be formed by bending the protrusion 130 at an angle of 180 degrees along the third bending line b3 and then bending the same at an angle of less than 180 degrees along the second bending line b2.

Alternatively, in embodiments, an angle at which the protrusion 130 is bent along the second bending line b2 and an angle at which the protrusion 130 is bent along the third bending line b3 may be equal to each other. For example, the bend portion 150 may be formed by bending the protrusion 130 at an angle of 180 degrees along the third bending line b3, and then bending the same once more at an angle of 180 degrees along the second bending line b2, to provide the bend portion 150 to face the sealing portion 123. In this case, the first portion 151 of the bend portion 150 may have a configuration bent at an angle of 360 degrees. Also, the first portion 151 of the bend portion 150 may be provided to contact the sealing portion 123.

In another embodiment, the protrusion 130 may be continuously rolled from an end portion thereof to form the bend portion 150, in addition to a bending method in which the protrusion 130 is folded along a bending line. Hereinafter, with reference to FIG. 4, a bend portion 150, prepared by such rolling, will be described.

Figure 4:
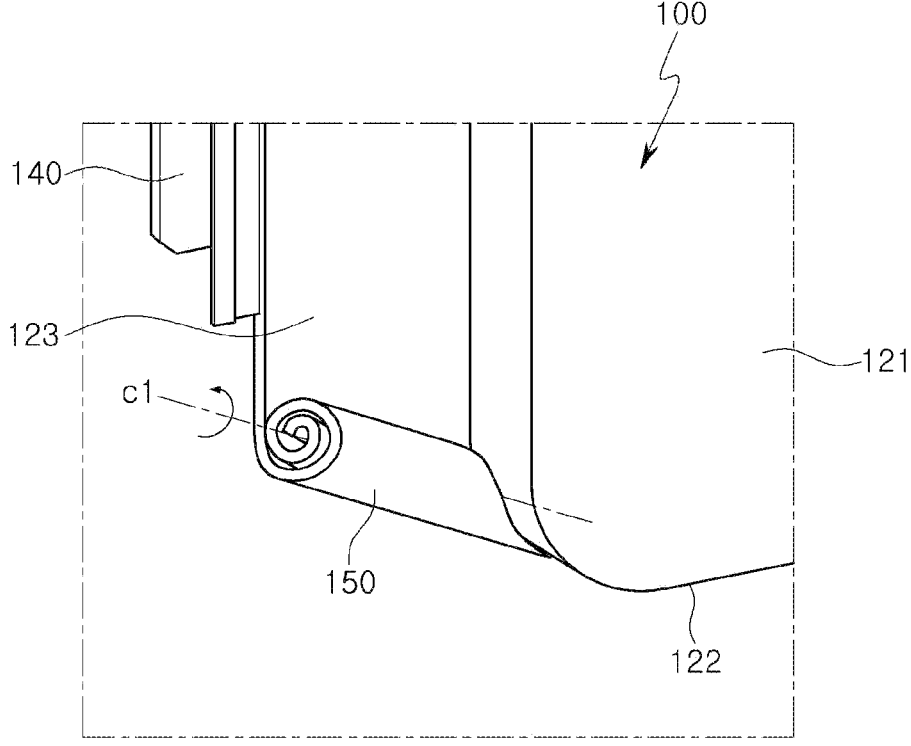
FIG. 4 is a partial perspective view of a battery cell having a bend portion according to embodiments.

FIG. 4 is a partial perspective view of a battery cell 100 having a bend portion 150 according to embodiments.

Like FIGS. 2 and 3, a battery cell 100 illustrated in FIG. 4 may have a protrusion 130 processed from the battery cell 100 illustrated in FIG. 1. For example, since a battery cell 100 in FIG. 4 may include all other components, except for a shape of the protrusion 130 illustrated in portion A of FIG. 1, descriptions overlapping FIG. 1 will be omitted.

In embodiments, a bend portion 150 may be formed in close contact with a sealing portion 123 in a state in which the protrusion 130 is rolled in one direction (e.g., counter-clockwise), and accordingly, an edge of the bend portion 150 may not protrude exceeding a folded portion 122 in an outward direction. For example, as illustrated in FIG. 4, the bend portion 150 may have a spiral shape around one axis cl. The one axis cl, which may be a central axis of the spiral shape of the bend portion 150, may be formed in various positions, and may be formed at an angle with respect to the folded portion 122 as illustrated in FIG. 4. The one axis cl is not limited to the position illustrated in FIG. 4. For example, the one axis cl may be formed to be parallel to the folded portion 122.

As the protrusion 130, has been widely spread, is rolled up, a size of the bend portion 150 may be further reduced than when the protrusion 130 is simply folded. Therefore, a shark-fin may be stably removed without interference between the bend portion 150 and a body portion 121.

In a process in which the battery cell 100 repeats charging and discharging, gas may be generated in an internal space of the body portion 121 in which an electrode assembly 110 is accommodated. The gas generated in this manner may apply pressure to the sealing portion 123 and the bend portion 150 of a pouch 120, and accordingly, the bend portion 150 may be unfolded again. Therefore, a fixing member capable of fixing a bent state of the bend portion 150 may be required.

Figure 5:
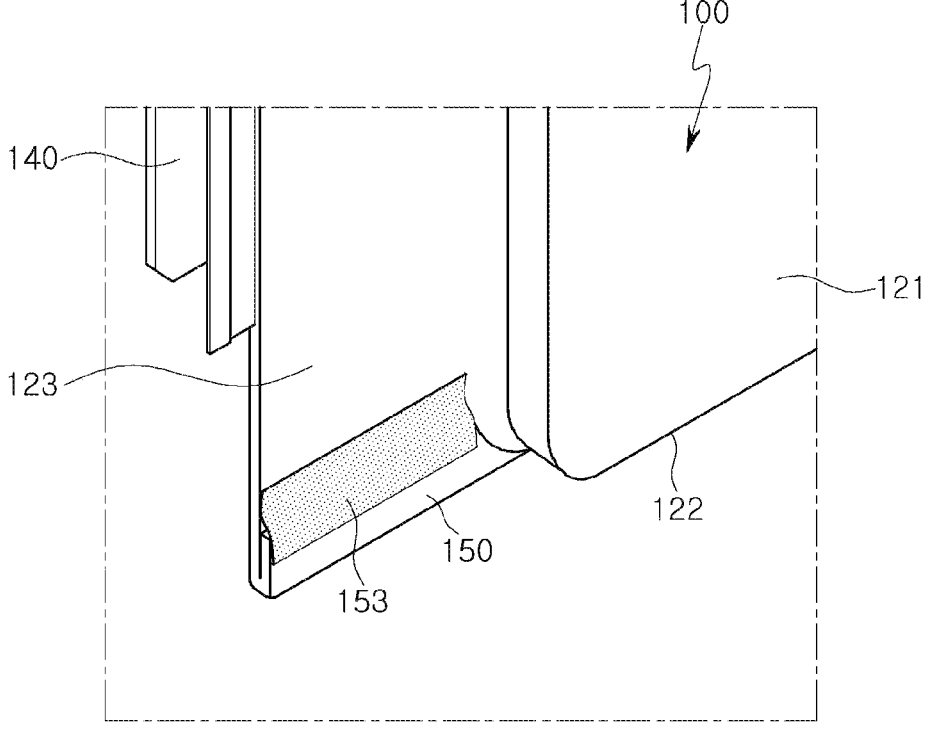
FIG. 5 is a partial perspective view of a battery cell provided with an adhesive member according to embodiments.
Figure 6:
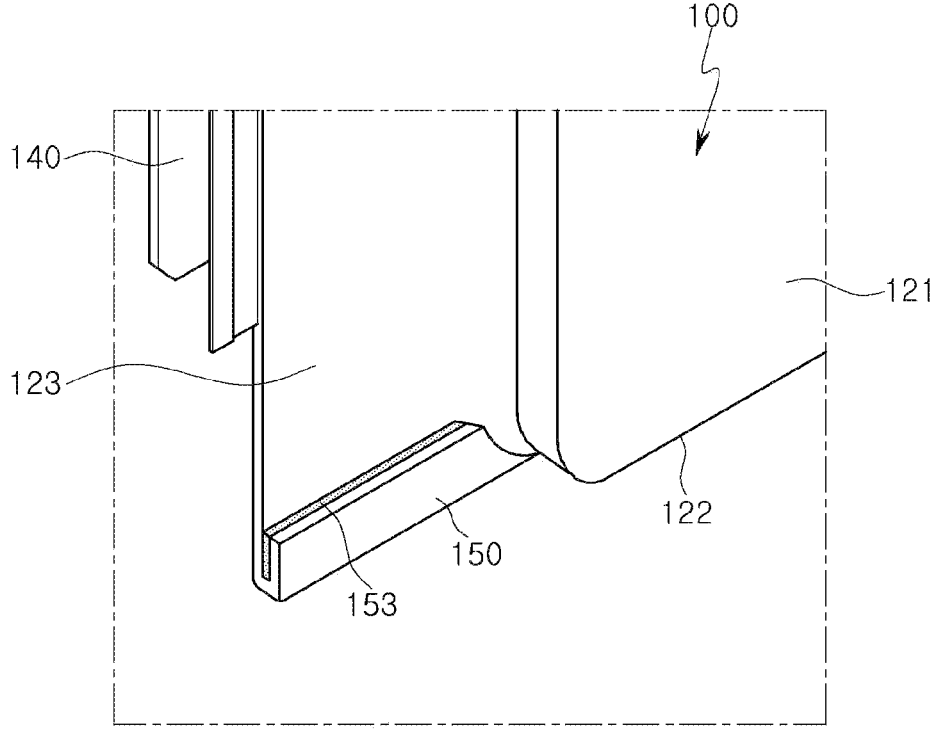
FIG. 6 is a partial perspective view of a battery cell provided with an adhesive member according to embodiments.

In embodiments, an adhesive member 153 may be additionally provided to help the bend portion 150 maintain the bent state. FIGS. 5 and 6 are views illustrating a bend portion 150 to which the adhesive member 153 is added.

FIGS. 5 and 6 are partial perspective views of a battery cell 100 provided with an adhesive member 153 according to embodiments. FIGS. 5 and 6 illustrate configurations in which an adhesive member 153 is added to the battery cell 100 having the bend portion 150 bent based on the first bending line b1, described in FIG. 2 above. These are only illustrative appearances of the adhesive member 153, and may be applied to the bend portion 150 described in FIGS. 3 and 4 in the same manner.

A battery cell 100 according to embodiments may further include an adhesive member 153 for maintaining bending of a bend portion 150. For example, as illustrated in FIG. 5, one surface of a bend portion 150 may be bent to face a sealing portion 123, and an adhesive member 153 may be coupled to the other surface of the bend portion 150.

In embodiments, the adhesive member 153 may be an insulating tape. Alternatively, the adhesive member 153 may be formed of a single-sided or double-sided adhesive tape containing an enamel or polyimide material having excellent insulation or chemical resistance characteristics, an inorganic adhesive tape, a hot melt, a structural adhesive, or the like. An adhesive member 153 according to embodiments may be attached over an upper surface of the bent bend portion 150 and the sealing portion 123, to maintain the bend portion 150 in close contact with the sealing portion 123.

In other embodiments, the adhesive member 153 may be provided between the bend portion 150 and the sealing portion 123 facing each other. For example, as illustrated in FIG. 6, one surface of a bend portion 150 may be bent to face a sealing portion 123, and an adhesive member 153 may be disposed between the one surface of the bend portion 150 and the sealing portion 123, to fix the bend portion 150 and the sealing portion 123 not to separate from each other. In this case, the adhesive member 153 may be provided with an insulating double-sided adhesive tape. The adhesive member 153 is not limited thereto, and for example, the adhesive member 153 may be an adhesive filled between the bent bend portion 150 and the sealing portion 123.

As mentioned above, the adhesive member 153 illustrated in FIG. 5 or FIG. 6 may be an example of the adhesive member 153 according to embodiments, and a configuration of the adhesive member 153 is not limited thereto. For example, an adhesive member 153 may be further provided even in a structure of the bend portion 150, prepared by rolling, described in FIG. 4. In this case, the adhesive member 153 may be provided on one surface of the bend portion 150, and as the bend portion 150 is rolled up to have a spiral shape, the adhesive member 153 on the one surface of the bend portion 150 may be in contact with the other surface of the bend portion 150, to fix bending of the bend portion 150.

As described above, as the adhesive member 153 is provided, bending of the bend portion 150 may be stably maintained despite a change in temperature or size of the battery cell 100 or a change in environment outside the battery cell 100.

According to embodiments, a plurality of battery cells 100 in which the bend portion 150 is bent may be stacked to form one cell stack, and one or more cell stacks configured in this manner may be combined to be accommodated in a battery module or battery pack.

Hereinafter, a battery module 200 including a battery cell 100 according to embodiments will be described with reference to FIGS. 7 to 9.

Figure 7:
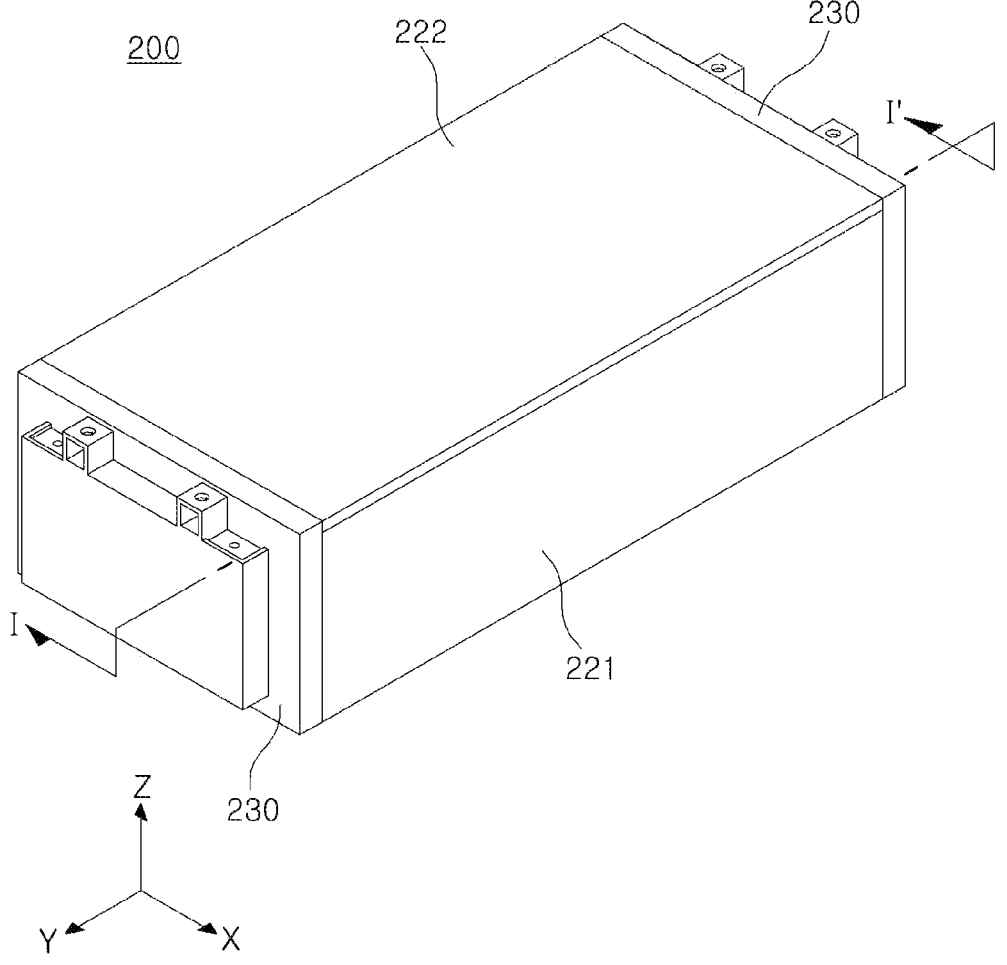
FIG. 7 is a perspective view of a battery module including a battery cell according to embodiments.
Figure 8:
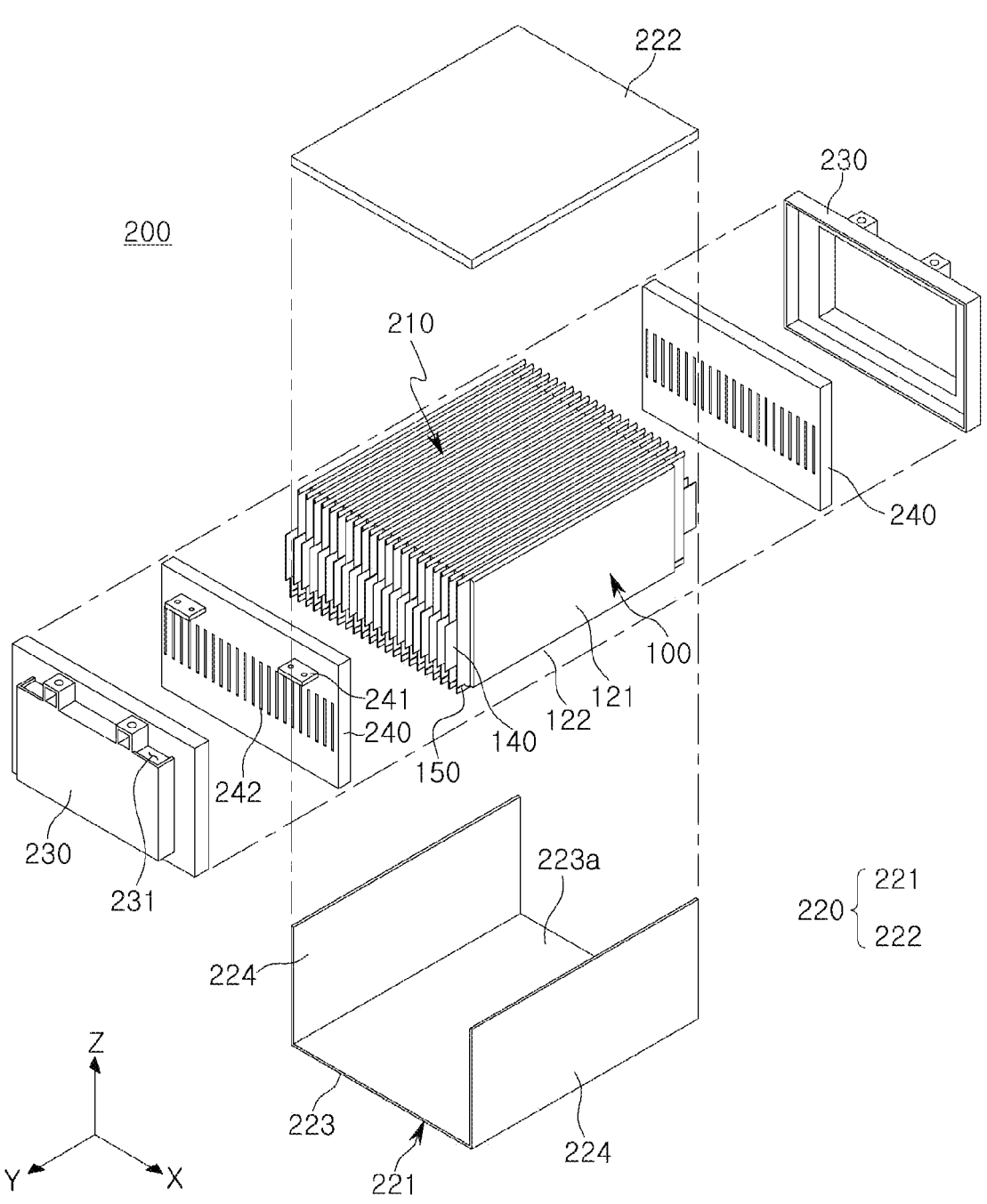
FIG. 8 is an exploded perspective view of a battery module including a battery cell according to embodiments.

FIG. 7 is a perspective view of a battery module 200 including a battery cell 100 according to embodiments, and FIG. 8 is an exploded perspective view of a battery module 200 including a battery cell 100 according to embodiments. FIG. 9 is a partial cross-sectional view of FIG. 7, taken along line I-I'.

A battery cell 100 described in FIGS. 7 and 8 may include any one of the battery cells 100 of FIGS. 2 to 6 described above. For example, a battery cell 100 illustrated in FIGS. 7 and 8 may include a bend portion 150 formed by bending or rolling a protrusion (e.g., 130 in FIG. 1) along at least one bending line. In this case, detailed description of bending of the bend portion 150 may refer to FIGS. 2 to 6.

A battery module 200 according to embodiments may include a cell stack 210 including at least one battery cell 100, a bus bar member 240 electrically connected to the cell stack 210, a module housing 220 surrounding the cell stack 210, an end plate 230 coupled to the module housing 220, and the like.

In embodiments, a cell stack 210 may include at least one battery cell 100. For example, the cell stack 210 may be formed by stacking a plurality of battery cells 100 in one direction (e.g., in the X-axis direction of FIG. 8). To maintain a shape of the cell stack 210, adjacent battery cells 100 may be attached to each other by a double-sided adhesive tape (not illustrated). For example, the double-sided adhesive tape (not illustrated) may be attached to a body portion 121 of each of the battery cells 100, to fix the plurality of battery cells 100 to each other.

In addition, at least one buffer pad (not illustrated) may be disposed on the cell stack 210. The buffer pad (not illustrated) may be disposed between the battery cell 100 and a side frame 224 of the module housing 220, and may also be disposed between the battery cells 100. Since such a buffer pad (not illustrated) may be compressed and elastically deformed when a specific battery cell 100 expands due to a swelling phenomenon, the buffer pad may suppress expansion of an entire volume of the cell stack 210. To this end, the buffer pad (not illustrated) may be formed of a polyurethane material, but a material thereof is not limited thereto.

The module housing 220 may accommodate the cell stack 210 therein, and may form an exterior of the battery module 200. For example, the module housing 220 may be disposed on an outside of the cell stack 210, to protect the battery cell 100 from an external environment. As illustrated in FIG. 8, the module housing 220 may include a housing body 221 having an open side, and a housing cover 222 that may be combined with the housing body 221 to form an internal space. In addition, the module housing 220 has a structure in which the end plate 230 is coupled to front and rear surfaces of the module housing 220 in the longitudinal direction, to cover the internal space formed by the housing body 221 and the housing cover 222.

The cell stack 210 may be disposed in the internal space of the module housing 220, according to embodiments. At least one surface constituting the module housing 220 may function as a heat dissipation plate radiating heat generated in the battery cell 100 externally.

In embodiments, the housing body 221 may include a lower frame 223 supporting a lower portion of the cell stack 210 and a side frame 224 supporting a side surface of the cell stack 210 and extending in a height direction of the battery module 200 (e.g., in the Z-axis direction) at both ends of the lower frame 223. The housing body 221 may have a structure in which the lower frame 223 and the side frame 224 are integrally formed. In addition, the housing body 221 may have a constant cross-sectional shape in the longitudinal direction (e.g., in the Y-axis direction) of the battery module 200, in this case, the housing body 221 may be manufactured by an extrusion process. It is also possible to configure the housing body 221 by combining the lower frame 223 and the side frame 224 as independent components, as needed.

The side frame 224 supports the cell stack 210 accommodated in the module housing 220 in a width direction (e.g., in the X-axis direction) of the battery module 200. In this case, a side surface of the cell stack 210 may be in direct contact with the side frame 224, but a heat dissipation pad (not illustrated) or a buffer pad (not illustrated) may be interposed between the side frame 224 and the side surface of the cell stack 210.

The lower frame 223 may include a seating surface 223a on which the cell stack 210 or the battery cells 100 included in the cell stack 210 are seated. The cell stack 210 may be seated on the seating surface 223a, to be supported in the height direction (e.g., in the Z-axis direction) of the battery module 200. In embodiments, between the seating surface 223a and the cell stack 210, a heat dissipation resin such as a thermal resin may be further provided to smoothly discharge heat generated in the battery cell 100 and cool the battery cell 100 (not illustrated). In addition, for more smooth heat dissipation, the battery cell 100 may be arranged such that a folded portion 122 faces the seating surface 223a.

The housing cover 222 may be disposed to oppose lower frame 223, and may be connected to an upper end portion of the side frame 224. Therefore, when the housing cover 222 is coupled to the housing body 221 to cover the side frame 224, the housing cover 222 and the housing body 221 may have a shape of a hollow tubular member.

The housing body 221 may be formed of a material having high thermal conductivity, such as a metal. For example, the housing body 221 may be formed of an aluminum material. A material of the housing body 221 is not limited thereto, and various materials may be used as long as the material has strength and thermal conductivity, similar to that of metal, even when it is not a metal. Also, like the housing body 221, the housing cover 222 may be formed of a material having excellent mechanical strength and thermal conductivity, such as a metal or the like.

Coupling of the housing body 221 and the housing cover 222 may be performed by welding contact surfaces of the side frame 224 and the housing cover 222 (e.g., by laser welding, or the like). The coupling of the housing body 221 and the housing cover 222 is not limited to the above-described welding coupling, and various modifications such as coupling by a sliding process or a bonding process, coupling using a fixing member such as a bolt, a screw, or the like, or other coupling, are possible.

The end plate 230 may be configured to be coupled to both side surfaces of the battery cell 100 on which electrode leads 140 are disposed, e.g., front and rear surfaces of the module housing 220 in the longitudinal direction (in the Y-axis direction), respectively, to cover open front and rear surfaces of the module housing 220. For example, as illustrated in FIG. 8, the end plate 230 may be coupled to the housing body 221 and the housing cover 222, to form an exterior of the battery module 200, together with the module housing 220.

The end plate 230 may be formed of a metal such as aluminum, and may be manufactured by a process such as die casting, extrusion/pressing, or the like. Also, the end plate 230 may include a through-hole 231 for exposing a connection terminal 241 of the bus bar member 240 externally. The end plate 230 may be coupled to the module housing 220 through a fixing member such as a screw or a bolt. The coupling of the end plate 230 is not limited thereto.

The bus bar member 240 may be provided between the end plate 230 and the cell stack 210. The bus bar member 240 may include a bus bar, which is electrically conductive, electrically connected to the electrode lead 140 of the battery cell 100, and a support plate, which is electrically insulating.

The bus bar member 240 may be coupled to one or both surfaces of the battery cell 100 on which the electrode lead 140 is disposed. Electrode leads 140 of the plurality of battery cells 100 may be interconnected through a body of the bus bar member 240. To this end, a coupling hole 242 through which the electrode lead 140 passes may be formed in the bus bar member 240. Coupling between the electrode lead 140 and the bus bar member 240 may be performed such that the electrode lead 140 passes through the coupling hole 242, e.g., by welding in a state in which the electrode lead 140 protrudes toward an outside of the bus bar member 240.

The connection terminal 241 for electrical connection externally may be provided on the bus bar member 240. Therefore, the battery cell 100 may be electrically connected externally through the connection terminal 241, and for this, the electrode lead 140 may be electrically connected to the connection terminal 241 through a circuit interconnection (not illustrated) provided in the bus bar member 240. The connection terminal 241 may be exposed externally through the through-hole 231 formed in the end plate 230 as illustrated in FIG. 8. Therefore, the through-hole 231 of the end plate 230 may be formed to have a size into which the connection terminal 241 is inserted.

Figure 9:
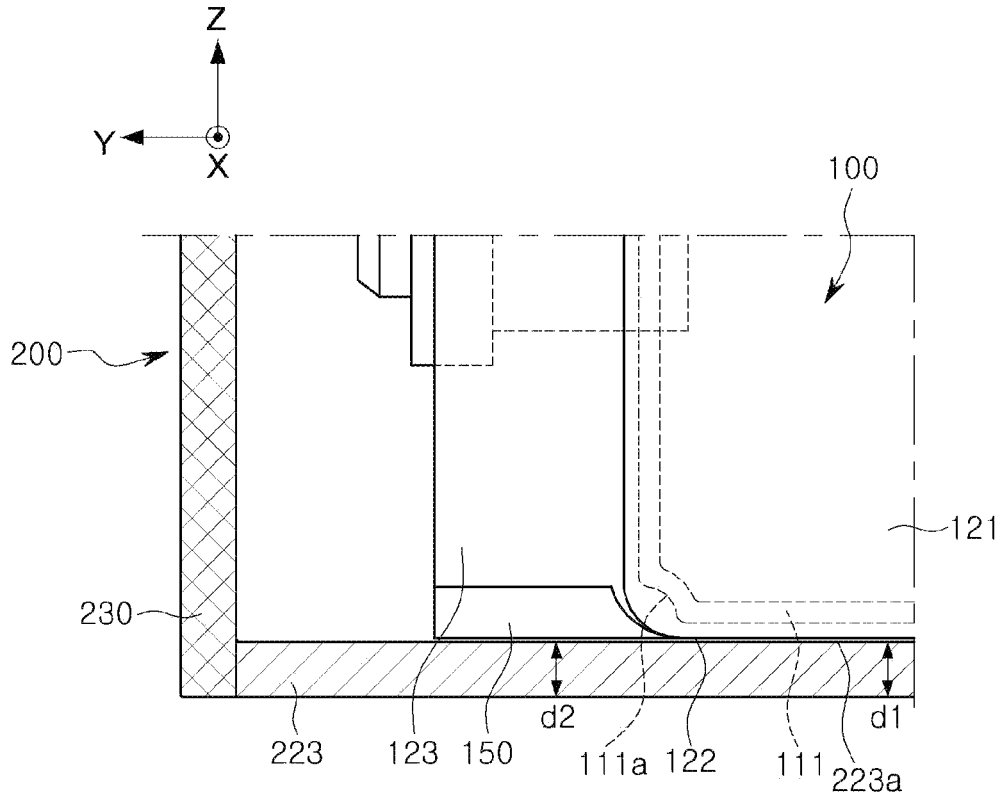
FIG. 9 is a partial cross-sectional view of FIG. 7, taken along line I-I'.

FIG. 9 may be a partial cross-sectional view of FIG. 7, taken along line I-I'. Specifically, FIG. 9 illustrates a configuration of a battery cell 100 according to embodiments in which a portion provided with the bend portion 150 is seated on the battery module 200. To facilitate understanding of a structure in which the battery cell 100 is seated, other components are illustrated, except that a portion of the battery cell 100 including the bend portion 150 and the folded portion 122, and the lower frame 223 and the end plate 230 of the battery module 200 will be omitted, in FIG. 9.

The battery cell 100 may be seated on the lower frame 223 of the battery module 200, and may be supported in the height direction (in the Z-axis direction) of the battery module 200. In embodiments, all of the battery cells 100 included in the cell stack (210 of FIG. 8) may be arranged such that the folded portion 122 faces the lower frame 223 of the battery module 200. For example, as illustrated in FIG. 9, the battery cell 100 may be seated on the lower frame 223 of the battery module 200 in a state in which the folded portion 122 facing downward in the height direction (in the Z-axis direction) of the battery module 200.

A battery cell 100 according to embodiments may be provided such that the bend portion 150 is bent such that an edge thereof does not protrude exceeding the folded portion 122 in an outward direction. In this case, the folded portion 122 of the battery cell 100 may form an outermost surface on one side of the battery cell 100, and the folded portion 122 may be in contact with the lower frame 223 of the battery module 200, as the battery cell 100 is seated in the battery module 200.

As described above with reference to FIGS. 2 to 4, the bend portion 150 of a battery cell 100 according to embodiments may be bent in various manners. For example, the bend portion 150 may be provided to have a bent shape along the first bending line (e.g., b1 of FIG. 2), parallel to the folded portion 122. In this case, since an edge of the bend portion 150 is formed along the first bending line (b1 of FIG. 2), the edge of the bend portion 150 may be formed on substantially the same height as a portion on which the folded portion 122 is seated in the lower frame 223. Alternatively, the bend portion 150 may be provided to have a bent shape along the second bending line (e.g., b2 of FIG. 3) having a predetermined angle with respect to the folded portion 122. In this case, since an edge of the bend portion 150 is formed along the second bending line (b2 of FIG. 3), the edge of the bend portion 150 may be formed on a higher position than a portion of the lower frame 223 on which the folded portion 122 is seated.

For example, as illustrated in FIG. 9, in a battery cell 100 according to embodiments, there may be no protruding portion in an outward direction (in the negative Z-axis direction in reference to FIG. 9) of the folded portion 122, the folded portion 122 may be seated on the battery module 200 in a state in which the folded portion 122 is in close contact with the seating surface 223a of the lower frame 223, and accordingly, a gap between the battery cell 100 and the seating surface 223a (e.g., dead space) may be reduced and energy density may be maximally increased in a limited internal space of the battery module 200. In addition, as the folded portion 122 is located close to the lower frame 223, heat may be smoothly discharged from the battery cell 100 to the battery module 200, to increase cooling efficiency.

In embodiments, a thickness d1 of a portion of the lower frame 223 facing the folded portion 122 of the battery cell 100 may be equal to a thickness d2 of a portion of the lower frame 223 facing the bend portion 150. For example, since a battery module 200 according to embodiments does not need to provide a separate avoidance space in the lower frame 223 to avoid a shark-fin, the thicknesses d1 and d2 of the lower frame 223 may be constant to increase structural stability.

In embodiments, in a battery cell 100, a plurality of electrode plates 111 may be located in a body portion 121. Therefore, when bending or rolling a protrusion (130 in FIG. 1) adjacent to a corner of the body portion 121, a folded portion of the protrusion (130 in FIG. 1) may physically interfere with an electrode plate 111. For example, as a protrusion (130 in FIG. 1) is bent, a folded portion of the protrusion (130 in FIG. 1) may press a plurality of electrode plates 111, such that the plurality of electrode plates 111 are in contact with each other, and short circuit occurs. Alternatively, due to the corner of the electrode plate 111, a free area for folding the protrusion (130 in FIG. 1) may be reduced, such that a large amount of force is consumed to form the bend portion 150.

To solve this problem, at least one of the plurality of electrode plates 111 included in a battery cell 100 according to embodiments may include a chamfered portion 111a formed by cutting a corner adjacent to the bend portion 150. For example, as illustrated in FIG. 9, at least a portion of a corner adjacent to the bend portion 150 among corners of the electrode plate 111 may be cut. A shape of the cut corner may be formed in various manners. For example, the chamfered portion 111a of the electrode plate 111 may have a shape curved inwardly of the electrode plate 111 or a shape cut in an oblique direction. Therefore, the bend portion 150 may be bent while avoiding the chamfered portion 111a of the electrode plate 111 with sufficient margin. Since a predetermined free space is secured between the body portion 121 of the battery cell and the electrode plate 111 by the chamfered portion 111a, the bend portion 150 may be formed more easily. In addition, as the chamfered portion 111a is formed at the corner of the electrode plate 111, in a process of bending the protrusion (130 in FIG. 1) of the battery cell 100, a problem in which the plurality of electrode plates 111 are in contact with each other and have short circuit may be prevented in advance.

A battery cell according to embodiments may include a bend portion in which a protruding portion of an edge of a pouch is bent, to reduce or delete an unnecessary protruding portion from a battery cell.

A battery cell according to embodiments may reduce or delete an unnecessary protruding portion, to further increase an energy density based on the same external size.

A battery module including a battery cell according to embodiments may secure structural rigidity while having a high energy density.

Although various embodiments of the present disclosure have been described in detail above, the scope of the present disclosure is not limited thereto, and various modifications and variations are possible within the scope without departing from the technical spirit of the present disclosure described in the claims. It will be apparent to one of ordinary skill in the art. In particular, a configuration of a battery cell according to embodiments is applicable not only to a battery module but also to a battery pack in which the battery cell is directly mounted. In addition, it may be implemented by deleting some components in the above-described embodiment, and each embodiment may be implemented in combination with each other.

What is claimed is:

1. A battery cell comprising:
an electrode assembly including a plurality of electrode plates; and
a pouch surrounding the electrode assembly,
wherein the pouch comprises:
a folded portion folded along one edge of the electrode assembly;
a sealing portion formed along at least a portion of a remaining edge of the electrode assembly; and
a bend portion including a first portion in which the sealing portion and the folded portion meet, wherein the first portion is bent toward the sealing portion, wherein at least one of the plurality of electrode plates comprises a chamfered portion in which a corner adjacent to the bend portion is cut, wherein the chamfered portion has a shape curved toward an inside of the plurality of electrode plates, and wherein a first side of the electrode assembly includes the chamfered portion, the first side of the electrode assembly facing the folded portion.

2. The battery cell of claim 1, wherein the bend portion is configured to face the sealing portion.

3. The battery cell of claim 2, wherein the bend portion is bent along a first bending line parallel to the folded portion.

4. The battery cell of claim 2, wherein the bend portion is bent along a second bending line formed obliquely to the folded portion, and an edge of the bend portion does not protrude beyond the folded portion in an outward direction.

5. The battery cell of claim 4, wherein the pouch further comprises a body portion to accommodate the electrode assembly in the body portion, and the second bending line passes by one corner of the body portion without passing through the body portion.

6. The battery cell of claim 4, wherein the bend portion comprises:

a first portion bent by 180 degrees along a third bending line parallel to the second bending line; and a second portion connected to the first portion and bent by 180 degrees along the second bending line.

7. The battery cell of claim 1, wherein the bend portion is provided to have a spiral shape rolled in one direction, and an edge of the bend portion does not protrude beyond the folded portion in an outward direction.

8. The battery cell of claim 7, wherein a central axis of the spiral shape is formed to be oblique to the folded portion.

9. The battery cell of claim 2, further comprising an adhesive member maintaining a bent state of the bend portion.

10. The battery cell of claim 9, wherein the adhesive member is disposed between the bend portion and the sealing portion.

11. A battery module comprising:

a battery cell comprising: an electrode assembly including a plurality of electrode plates; and a pouch surrounding the electrode assembly, wherein the pouch comprises:

a folded portion folded along one edge of the electrode assembly; a sealing portion formed along at least a portion of a remaining edge of the electrode assembly; and a bend portion including a first portion in which the sealing portion and the folded portion meet, wherein the first portion is bent toward the sealing portion; and a frame having a seating surface on which the folded portion of the battery cell is seated, wherein an edge of the bend portion of the battery cell is disposed at the same height as the seating surface or disposed at a position higher than the seating surface, wherein at least one of the plurality of electrode plates comprises a chamfered portion in which a corner adjacent to the bend portion is cut, wherein the chamfered portion has a shape curved toward an inside of the plurality of electrode plates, and wherein a first side of the electrode assembly includes the chamfered portion, the first side of the electrode assembly facing the folded portion.

12. The battery module of claim 11, wherein a thickness of a portion of the frame facing the folded portion is equal to a thickness of a portion of the frame facing the bend portion.

13. The battery module of claim 11, wherein the bend portion is configured to face the sealing portion.

14. The battery module of claim 13, wherein the bend portion is bent along a first bending line parallel to the folded portion.

15. The battery module of claim 13, wherein the bend portion is bent along a second bending line formed obliquely to the folded portion, and an edge of the bend portion does not protrude beyond the folded portion in an outward direction.

16. The battery module of claim 11, wherein the bend portion is provided to have a spiral shape rolled in one direction, and an edge of the bend portion does not protrude beyond the folded portion in an outward direction.

17. The battery module of claim 16, wherein a central axis of the spiral shape is formed to be oblique to the folded portion.

* * * * *